Figure 1:
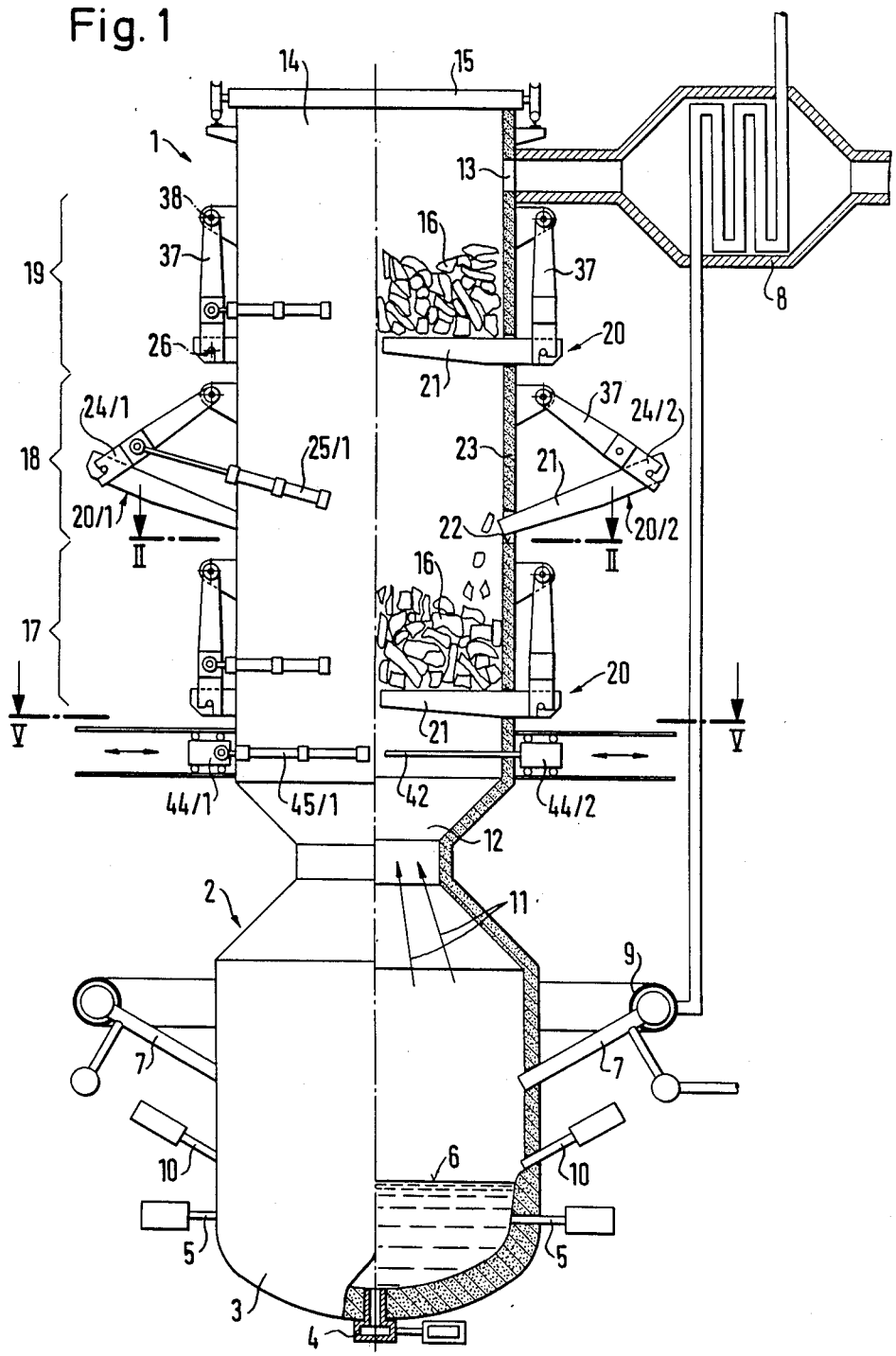

United States Patent [19]

Weber

[11] Patent Number: 4,852,858

[45] Date of Patent: Aug. 1, 1989

[54] CHARGING MATERIAL PREHEATER FOR PREHEATING CHARGING MATERIAL FOR A METALLURGICAL SMELTING UNIT

[75] Inventor: Ralph Weber, Rio de Janeiro, Brazil

[73] Assignee: Kortec AG, Zug, Switzerland

[21] Appl. No.: 183,939

[22] Filed: Apr. 20, 1988

[30] Foreign Application Priority Data

Apr. 21, 1987 [DE] Fed. Rep. of Germany ....... 3713369

[51] Int. Cl.$^4$ ............................................... C22B 1/00
[52] U.S. Cl. ..................................... 266/175; 266/901; 432/162
[58] Field of Search ................. 266/175, 901; 432/162

[56] References Cited

U.S. PATENT DOCUMENTS

| 649,135 | 5/1900 | Millett | 432/162 |
| 4,691,900 | 9/1987 | Maeda | 266/175 |

FOREIGN PATENT DOCUMENTS 150005  8/1984  Japan ..................... 266/901

*Primary Examiner*—Robert McDowell

[57] ABSTRACT

A charging material preheater for preheating the charging material for a metallurgical smelting unit comprising a container for accommodating the charging material to be preheated, which is provided at the bottom with a grid comprising individual mutually spaced-apart grid bars which are passed outwardly through passage openings in the wall of the container and which are mounted in groups in support beams which are movable by an actuating means between a closed position in which the grid bars project into the interior of the container and a release position in which the grid bars are withdrawn from the interior of the container. In order to permit replacement of the individual grid bars during operation of the preheater and to reduce the obstacle presented by jammed pieces of charging material to the withdrawal movement of the grid bars from the interior of the container into the release position, the grid bars are mounted rotatably about a horizontal axis in the support beam and supports are associated with the grid bars at the points of entry into the container. Control edges at the undersides of the grid bars provide that the grid bars can be caused to move with a pivotal motion when they are retracted from the interior of the container.

17 Claims, 3 Drawing Sheets

CHARGING MATERIAL PREHEATER FOR PREHEATING CHARGING MATERIAL FOR A METALLURGICAL SMELTING UNIT

"The invention relates to a preheater for charging material for a metallurgical smelting unit, comprising a container provided at the bottom with a grid with individual spaced-apart grid bars which extend to the exterior through passage openings in the container wall; with the outer ends of the grid bars, which are arranged in mutually parallel relationship, being mounted in a support beam movable by an actuator between a closed position in which the grid bars project into the interior of the container and a release position in which the grid bars are retracted out of the interior."

A charging material preheater of that kind is disclosed in "U.S. Pat. No. 4,389,043. It is used therein for"; heating up the charging material, in particular metal scrap, for a smelting vessel, by means of the hot waste gases from the latter. For the purpose the charging material preheater is fitted on to the smelting vessel and the bottom thereof is formed by a grid comprising individual mutually spaced-apart, positively cooled grid bars which are extended outwardly through openings in the wall of the container. Grid bars which are arranged in mutually parallel relationship are clamped in respective groups in a frame structure which, together with the grid bars, forms a structural unit, namely a grid portion. For example the arrangement may have two oppositely disposed grid portions which are movable towards and away from each other. In the introduced condition (closed position) the two grid portions are in contact with each other in the middle of the charging material preheater and retain the charging material in the preheater, while when the grid portions are moved outwardly into the release position, a gap is initially formed in the middle, which increases in width so that the charging material can fall in a controlled fashion at the centre downwardly into the smelting vessel.

In the case of the known charging material preheater, the frame structures of the grid portions are movable along rails for the purposes of moving the grid portions in and out. The grid portions may be horizontal or they may be inclined slightly downwardly towards the middle of the smelting unit.

The journal METAL BULLETIN MONTHLY, October 1986, pages 47 to 51, discloses a metallurgical smelting unit with a charging material preheater disposed thereon, which has three preheating portions in superposed relationship. Each preheating portion is delimited downwardly by a grid which can occupy a closed position and a release position.

The grid portions and the actuation arrangement therefor are subject to a high level of mechanical loading.

When the charging material is introduced into the charging material preheater, large pieces of scrap often drop on to the grid bars and produce a severe impact loading on the grid bars which are clamped in the frame structure. The impacts have to be carried by the frame structure and the support construction in which the frame structures are displaceably mounted. That presupposes a support construction which is solidly constructed and anchored and for which a comparatively large amount of space must be made available.

In the event of damage to a grid bar, the grid portion in question has to be withdrawn, the means clamping same in the frame structure has to be released and the damaged grid bar has to be replaced by a new one. As, in the release position of a grid portion, the charged preheater or the respective preheater portion of the charging material preheater is not capable of retaining the charging material, the operation of replacing a grid bar involves an interruption in operation of the system.

When, after a charge has been preheated, the grid portions are moved into the release position, the charging material presses against the grid portions and prevents them from being pulled back into the release position. That is a particularly serious matter if pieces of the charging material have jammed between individual grid bars. Therefore, the actuating means for the grid portions must be of a correspondingly powerful design. If pieces of the charging material are jammed between grid bars, not only the grid bars but also the wall of the charging material preheater, in the region in which the grid bars extend therethrough, are subjected to a high level of mechanical stress when the grid portions are withdrawn.

The waste gases from the metallurgical smelting unit, which are used for heating the material in the charging material preheater, are subject to major fluctuations in temperature during the smelting and refining period. In that connection, particularly when the charging material is to be preheated almost to smelting temperature, the charging material may suffer from caking and agglomeration in the lower region of the charging material preheater, which not only involved impeding the through-flow of charging material but also additionally impedes movement of the grid portions into the release position.

The object of the present invention, in a charging material preheater of the kind set forth in the classifying portion of claim 1, is to permit replacement of the individual grid bars during operation of the preheater. The invention further seeks to provide that the shock loadings which occur when the charging material is introduced into the preheater can be moderated and safely carried by a lighter compact construction. The invention also seeks to provide that the impediment to the withdrawal movement of the grid bars out of the interior of the container into the release position, due to jammed or agglomerated pieces of charging material, is to be reduced so that not only the amount of power required for the withdrawal movement of the grid portions but also the mechanical loading on the grid bars and the furnace wall upon the withdrawal movement thereof can be reduced.

"The invention is characterized by the grid bars being mounted in the support beam so as to be rotatable about a horizontal axis, and by support means at the points of entry into the container."

While in the known charging material preheater the grid bars are connected by being clamped in a frame structure to form a rigid structural unit and that frame structure is guided by means of rails, the construction according to the invention provides that the grid bars are mounted pivotably in a support beam and they are supported on stationary support means at the points of entry into the container. If an individual mounting in the support beam is associated with each grid bar or also individual groups of grid bars, then the respective grid bar or said group can be quickly removed by releasing that mounting. That ensures rapid interchangeability in respect of individual damaged grid bars.

Due to the individual pivotability of individual grid bars or grid bars which are combined together to form a respective group, a pivotal movement about the axis of rotation in the support beam can be imparted to the grid bars upon movement of the support beam from the closed position into the release position, so that pieces of charging material which are jammed between the grid bars are loosened. Such a pivotal movement can be achieved in a simple manner by the lower edge of the respective grid bars, which slides on the associated support means upon the retraction movement of the grid bars, being in the form of a control edge which for example in the longitudinal direction of the grid bar is alternately provided with portions of different inclination, preferably a stepped configuration. If the control edges of adjacent grid bars or adjacent groups of grid bars are of different configurations, then it is possible to produce, between such adjacent grid bars, a phase-displaced pivotal movement and in particular also a pivotal movement in opposite directions, which is particularly advantageous in regard to loosening up jamming pieces of charging material. The amount of force involved in withdrawing the grid bars and the level of mechanical loading can be considerably reduced by virtue of that arrangement.

Preferably the support means are in the form of elastic support means. In that way the shock loadings when the charging material is introduced into the preheater or into the respective preheater portion of the preheater can be cushioned and the retraction movement of the grids can also be advantageously affected.

The support means may be secured directly to the steel casing of the charging material preheater. Likewise it is advantageous for the support beam to be secured to pivotal arms which are pivotally mounted to the outside wall of the container in a plane which lies above the passage openings for the grid bars which are mounted in the support beam. In that way all forces acting on the grid bars may be transmitted to the steel plate construction of the charging material preheater and there is no need for additional anchoring to other components.

In order to prevent the lower region of the charging material preheater from suffering from local overheating due to the heating gas, it is possible at the heating gas entry side to provide cooling bars which are water-cooled and which can be introduced to a greater or lesser distance into the container. The bars then act as a heat exchanger which provides an adjustable effective surface area and by means of which excessively hot heating gases can be cooled down to the desired temperature before they come into contact with the charging material in the charging material preheater. That arrangement is particularly advantageous when the container is fitted on to a smelting vessel and the hot waste gases of the smelting vessel serve as the heating gases.

Figure 2:
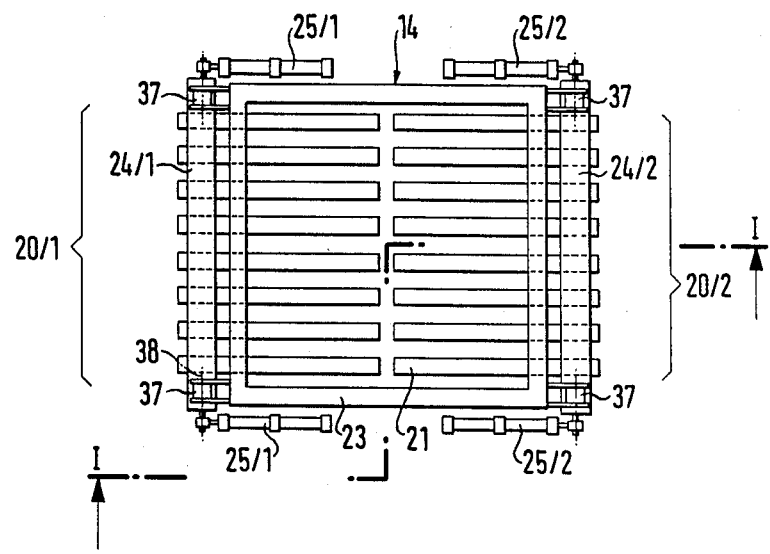
Figure 5:
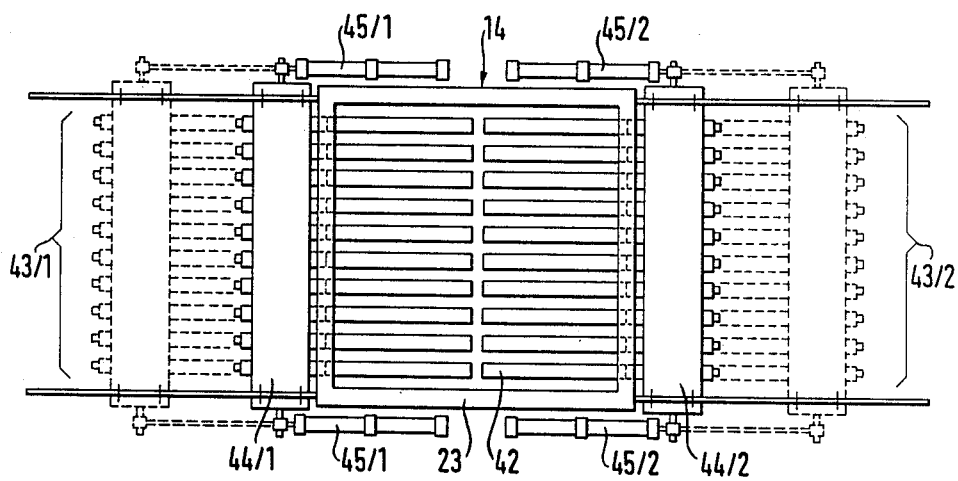
Figure 3:
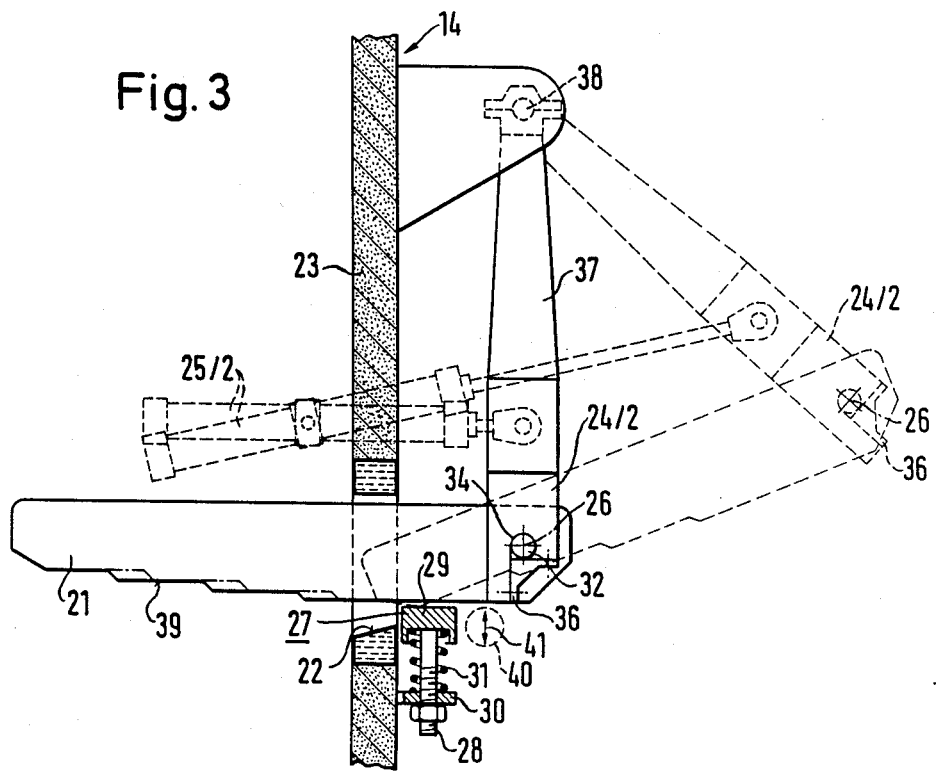
Figure 4:
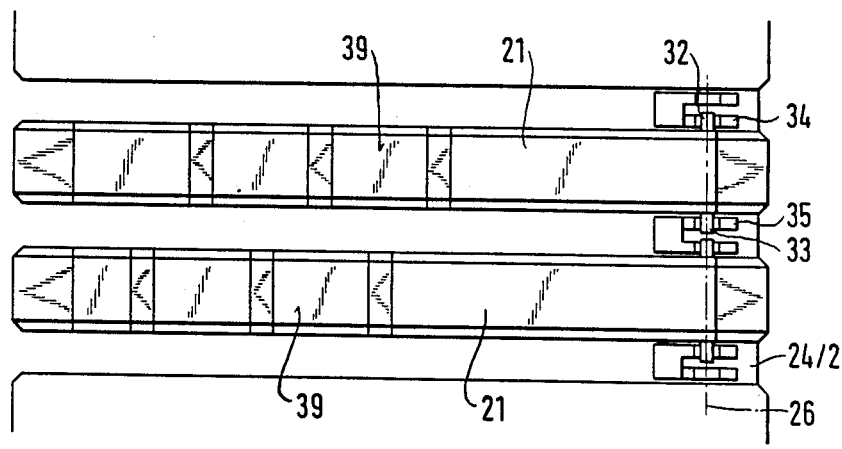

The invention will now be described in greater detail by means of an embodiment with reference to five Figures in which:

FIG. 1 is a partly sectional view of a charging material preheater which is fitted on to a metallurgical smelting unit, FIG. 2 is a view in section taken along line II—II in FIG. 1, FIG. 3 shows a portion from FIG. 1 on an enlarged scale, to illustrate the way in which the individual grid bars are suspended, FIG. 4 is a view from below of two adjacent grid bars, and FIG. 5 is a view in section taken along line V—V in FIG. 1.

In FIG. 1, a charging material preheater 1 is fitted on to a metal smelting furnace 2 and connected thereto to provide a construction unit. The metallurgical smelting unit is shown in section in the righthand half of FIG. 1.

The smelting furnace comprises a furnace vessel 3 with a bottom tapping 4 and a plurality of nozzles which are passed through the wall of the furnace vessel. The unit includes under-bath nozzles 5 which open into the furnace vessel below the level 6 of the molten metal bath and which are used to inject oxygen, and also nozzles 7 which open into the furnace vessel above the metal bath and which can be used to introduce air which is preheated in a heat exchanger 8, by way of a ring conduit 9, as well as oxygen for the post-combustion phase. Finally, disposed above the surface 6 of the molten metal bath are further nozzles which can be used as burners, as indicated at 10.

The hot waste gases from the smelting furnace 2 which are indicated by arrows 11 pass into the charging material preheater which is fitted on to the smelting furnace, at the intake side 12, flow upwardly through the charging material preheater and, after giving off the major part of their sensible heat to the charging material in the charging material preheater, leave it at the upper exit end 13 in order then also to flow through the heat exchanger 8 for preheating of the air, before the gases pass into the waste gas chimney. The charging material preheater is in the form of a container 14 which is closed upwardly by a cover 15. The cover can be moved to the side for introducing the charging material 16.

The charging material preheater 1 shown in FIG. 1 comprises three preheater portions 17, 18 and 19 which are disposed in superposed relationship and which are each of the same construction. Each preheater portion is provided at the bottom with a grid 20 comprising individual mutually spaced-apart grid bars 21 which are extended to the exterior through passage openings 22 in the container wall 23.

As shown in FIG. 2, the outer ends of a respective group of grid bars 21 which are arranged in mutually parallel relationship are mounted in a support beam 24/1 and 24/2 respectively, which is movable by an actuating means 25/1 and 25/2 respectively between a closed position in which the grid bars 21 project into the interior of the container 14 and a release position in which the grid bars 21 are withdrawn from the interior of the container. In FIG. 1 the grid bars of the lower and upper preheater portions 17 and 19 respectively are disposed in the closed position in which the grid is capable of holding the charging material 16 in the respective preheater portion and the grid bars 21 of the middle preheater portion 18 are disposed in the release position. Thus the grid bars which are mounted in the support beam 24/1 form a unit, namely a grid portion 20/1, while the grid bars mounted in the support beam 24/2 form a further oppositely disposed unit, namely a grid portion 20/2. Each of the preheater portions 17, 18 and 19 respectively is thus closed at the bottom by individually actuable grid portions 20/1 and 20/2.

FIG. 3 shows a part of the structure illustrated in FIG. 1 on an enlarged scale, wherein the position of a grid bar 21 in the closed position is illustrated in solid lines while the position of that grid bar in the release position is shown in broken lines. FIG. 4 shows a view from below of two adjacent grid bars.

Each grid bar 21 is mounted individually rotatably about a horizontal axis 26 in the associated support beam 24/2 and associated therewith at its point of entry into the container 14, that is to say in the vicinity of the passage opening 22 provided for the respective grid bar in the wall 23 of the container, is a support 27.

Although in the illustrated embodiment each grid bar 21 has its own support 27 associated therewith and each grid bar is also pivotable independently of the others about the horizontal axis 26, it is also possible to provide common supports for a number of grid bars and to provide a rotationally rigid connection between the respective grid bars.

The support 27 is preferably in the form of an elastic support and in the illustrated construction includes a wearing cap 29 which is fitting on to a pin or bolt 28. The bolt 28 is axially slidably mounted in a flange 30 and is urged upwardly by a compression spring 31.

The rotatable mounting of a grid bar 21 in the associated support beam 24/2 is effected in the illustrated embodiment by each grid bar being provided at one end with two lateral rotary trunnions 32 and 33 which are each mounted in a respective mounting 34 and 35. The mountings have a U-shaped recess (see FIG. 3) in which the respective trunnion is accommodated and they are closed off by means of angle members 36 which are screwed in position. Each rotary trunnion has its own angle member associated therewith so that by releasing the angle members at both sides of a grid bar, that grid bar can be released from the array with the other grid bars of the same grid portion, and replaced. Each support beam 24/1 and 24/2 is secured to two pivotal arms 37 (see also FIGS. 1 and 2) which are pivotally mounted to the outside wall of the container 14 by means of pivot mountings 38 in a plane which lies above the passage openings 22 of the grid bars 21 which are mounted in the support beam 24/1 or 24/2 respectively. Associated with each of the pivotal arms 37 as an actuating means 25/1 and 25/2 respectively is a hydraulic cylinder unit which is mounted rotatably to the wall 23 of the container and which engages the associated pivotal arm 37 between the pivot mounting point thereof and the fixing location of the support beam 24/1 and 24/2 respectively. The hydraulic cylinder units of the pivotal arms of a support beam are synchronously controllable so that the respective support beam can be pivoted from the position shown in solid lines in FIG. 3 uniformly about the axis of the pivot mounting 38 outwardly into the position shown in broken lines. When that pivotal movement occurs, all the grid bars 21 of a grid portion 20/1 and 20/2 respectively are withdrawn from the interior of the container, sliding with their lower edges over the respectively associated support 27. In the illustrated embodiment the container 14 is of a rectangular configuration in plan and the support beams 24/1 and 24/2 extend in all positions parallel to the oppositely disposed sides of the rectangular shape of the container 14.

As shown in FIGS. 3 and 4, the lower edge of the individual grid bars 21, which edge slides over the associated support 27 when the support beam moves, is in the form of a control edge 39 which in the illustrated embodiment is of a stepped configuration. When the control edge slides over the support as the respective grid portion and therewith the respective grid bar 21 is withdrawn from the container, then in that withdrawal movement the part of the grid bar which is still disposed within the container is lowered in a stepwise manner and thereby the grid bar is caused to perform a pivoting or shaking movement which substantially reduces the force required for the withdrawal of the bar from the container. It is particularly advantageous if the control edges 39 of adjacent grid bars 21 are of different configurations, that is to say for example the stepped configuration of the control edges 39 of adjacent grid bars is displaced relative to each other, as shown in FIG. 3 by means of a dash-dotted line relative to the solid line. The view from below in FIG. 4 also shows the mutual displacement of the stepped configurations.

When the control edges 39 of adjacent grid bars 21 are of different configurations, then, when the grid bars are retracted, they perform a pivotal movement in opposite directions so that pieces of charging material which are jammed between the grid bars are released. A further reduction in the force required for retracting the grid bars from the container is achieved if the wearing caps 29 of the supports 27 are replaced by rollers or if rollers are additionally provided—such a roller is shown in broken lines in FIG. 3 at reference 40—which can be lifted to such a degree that the grid bars 21 can be supported on the rollers by means of their edges when the grid bars are withdrawn. The possible raising and lowering movements are diagrammatically indicated by the double-headed arrow 41.

As shown in FIGS. 1 and 5, cooling bars 42 can be pushed into the container 14 at the entrance 12 for the heating gases. The cooling bars 42 include fluid ducts and they serve to cool down the heating gases 11 which flow up out of the furnace vessel 3, to such an extent as to prevent agglomeration of individual pieces of the charging material.

Similarly to the grid bars 21, the cooling bars 42 are combined together in groups, more specifically in the illustrated embodiment forming a group 43/1 and a group 43/2. The cooling bars 42 of the group 43/1 are held in a carrier 44/1 and the cooling bars of the group 43/2 are held in a carrier 44/2. As can be seen from FIG. 1, the carriers 44/1 and 44/2 are movable horizontally. By means of hydraulic drive arrangements 45/1 and 45/2 which are individually controllable, the cooling bars of a group can be introduced to a greater or lesser degree into the interior of the container of the charging material preheater 1 and thus the cooling action of the cooling bars 42 which act as a heat exchanger can be adapted to the requirements involved.

It should also be mentioned that not only the cooling bars 42 but also the grid bars 21 have fluid ducts and suitable connections to a fluid circuit.

With the above-described charging material preheater the charging material may be moved stepwise through the preheater regions 19, 18 and 17 and, in conjunction with the controllable cooling action by means of the cooling bars 42, can be uniformly heated to almost the softening temperature of the material. The grid portions of the individual preheater stages can be actuated individually.

I claim:

1. A charging material preheater for preheating charging material for a metallurgical smelting unit, comprising:
    a container for accommodating the charging material to be preheated, said container having a container wall and at least one grid comprising individual spaced-apart grid bars which extend to the exterior of the container through passage openings in the container wall, said grid bars being arranged in mutually parallel relationship;

outer ends of said grid bars being mounted in a support beam which is movable by actuating means between a closed position in which the grid bars project into the interior of the container and a release position in which the grid bars are retracted out of the interior of the container;

the grid bars being mounted in the support beam so as to be rotatable about a horizontal axis; and support means for said grid bars at the points of entry into the container.

2. A charging material preheater according to claim 1, wherein the support means are resilient support means.

3. A charging material preheater according to claim 1, wherein lower edges of at least some of the grid bars slide over the support means upon a movement of the support beam from the closed position into the release position, and are formed in the longitudinal direction of the grid bars are control edges which during retraction displace the respective grid bars with a pivotal movement about their axis of rotation in the support beam.

4. A charging material preheater according to claim 3, wherein the control edge of the respective grid bar comprises portions of different inclination which alternate in the longitudinal direction of the respective grid bar.

5. A charging material preheater according to claim 4, wherein the control edge as in the form of a stepped profile member.

6. A charging material preheater according to claim 4, wherein the control edges of adjacent grid bars are of different configurations.

7. A charging material preheater according to claim 1, wherein associated with at least some of the support means are rollers which can be raised and lowered and on which the grid bars are supported by a lower edge thereof during retraction.

8. A charging material preheater according to claim 1, wherein the grid bars are individually releasably mounted in the support beam.

9. A charging material preheater according to claim 1, wherein the support beam is secured to pivotal arms which are pivotally mounted to the wall of the container on the outside thereof in a plane which lies above the passage openings for the grid bars mounted in the support beam.

10. A charging material preheater according to claim 9, wherein said pivotal arms include at least two pivotal arms which are provided with synchronously controllable actuating means which are mounted rotatably on the container wall and which engage the respective pivotal arm between the mounting means thereof and the support beam.

11. A charging material preheater according to claim 1, wherein the container is of a rectangular configuration in plan.

12. A charging material preheater according to claim 1, wherein the grid is formed by two groups of grid bars which can be pushed into the container from opposite sides thereof.

13. A charging material preheater according to claim 1, comprising cooling bars, and means for pushing the cooling bars into the container at an entry side for hot gas from a smelting unit.

14. A charging material preheater according to claim 1, wherein the container includes at least two preheater portions which are disposed in superposed relationship, each preheater portion having grid bars, and having means for introducing the grid bars into and retracting the same from the container in a group-wise manner.

15. A charging material preheater according to any one of claims 1 to 14, comprising means for fitting the container onto a furnace vessel, and means for introducing hot waste gases of the furnace vessel as heating gases into the container.

16. A charging material preheater according to claim 1, wherein the grid bars have ducts for a cooling fluid.

17. A charging material preheater for preheating charging material for a metallurgical smelting unit, comprising:

a container for accommodating the charging material to be preheated, said container having a container wall and at least one grid comprising individual spaced-apart grid bars which extend to the exterior of the container through passage openings in the container wall, said grid bars being arranged in mutually parallel relationship;

outer ends of said grid bars being mounted in a support beam which is movable by actuating means between a closed position in which the grid bars project into the interior of the container and a release position in which the grid bars are retracted out of the interior of the container;

cooling bars;

a smelting unit;

means for pushing the cooling bars into the container at an entry side for hot gas from the smelting unit;

means for fitting the container onto the smelting unit, and means for introducing hot gas from the smelting unit as heating gases into the container.

* * * * *